Patented July 25, 1939

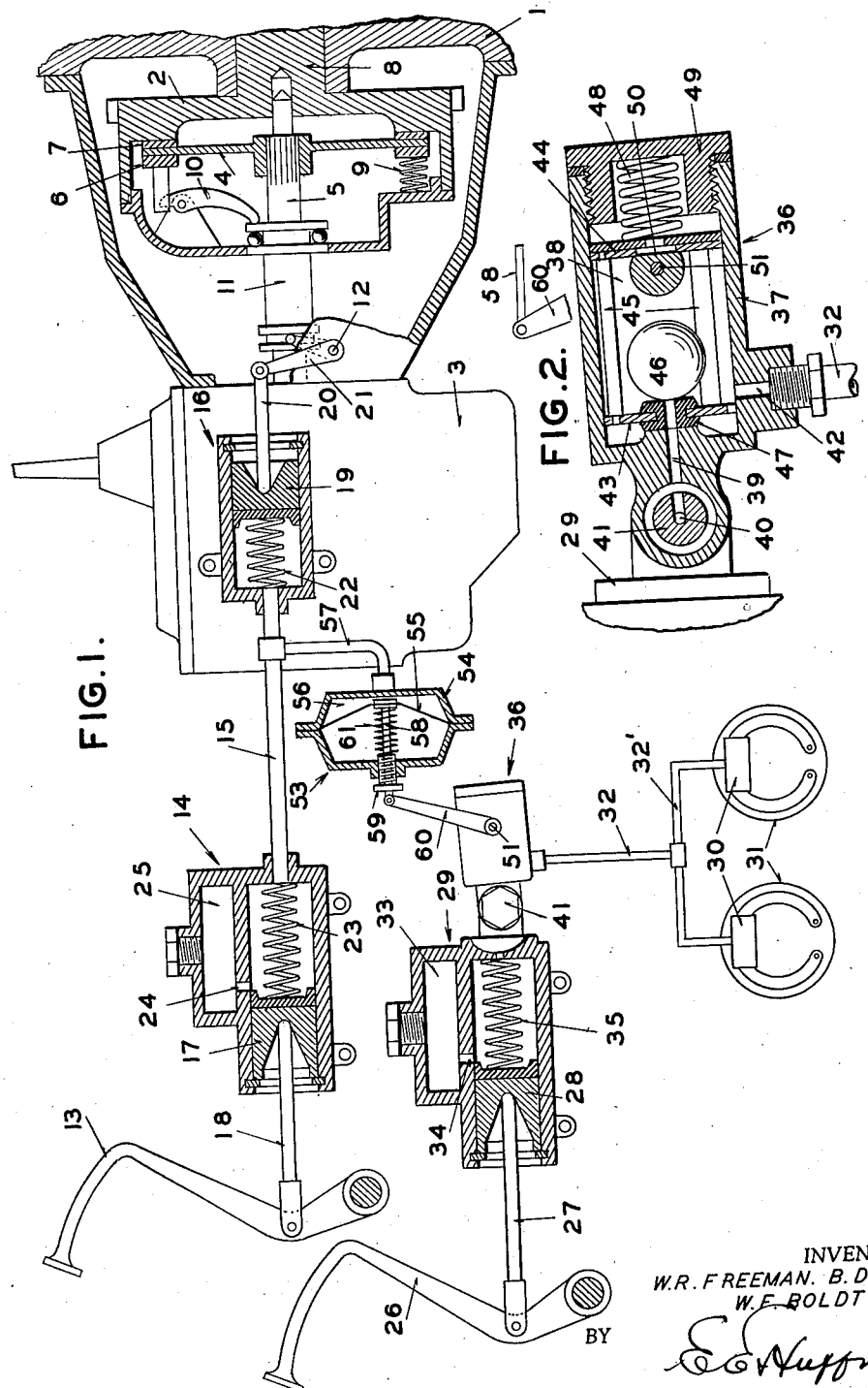

2,167,501

UNITED STATES PATENT OFFICE 2,167,501

CLUTCH AND BRAKE CONTROL MECHANISM

Walter R. Freeman, University City, Burns Dick, Ferguson, and Werner F. Boldt, Overland, Mo., assignors to Wagner Electric Corporation, St. Louis, Mo., a corporation of Delaware Application June 30, 1937, Serial No. 151,163

10 Claims. (Cl. 192—13)

Our invention relates to improvements in means for preventing release of the brakes of a vehicle from applied position when the clutch or an equivalent mechanism is operated to disconnect the wheels of the vehicle from the source of power.

One of the objects of our invention is to control a brake release preventing means by the fluid pressure in a separate fluid pressure actuated mechanism.

A more specific object of our invention is to so control the brake release preventing means by the pressure in apparatus for fluid actuation of the clutch mechanism, that the release preventing means will be permitted to be operative when the fluid pressure in the clutch actuating system is sufficient to disengage the clutch.

Other objects of our invention will become apparent from the following description taken in connection with the accompanying drawing in which Figure 1 is a schematic view of a fluid-actuated clutch mechanism and a fluid-actuated brake mechanism showing our invention associated therewith; and Figure 2 is a cross-sectional view of the control valve mechanism for preventing release of the brakes.

Referring to the drawing, the reference character 1 indicates the internal combustion engine of a motor vehicle which is connected through a main friction clutch 2 and a change speed gearing 3 to the wheels of the vehicle in a well-known manner. The clutch is of the usual type and comprises a clutch plate 4 splined on the gearing shaft 5 and adapted to be frictionally gripped between a pair of clutch elements 6 and 7 carried by the end of the engine shaft 8. The element 6 is axially movable relative to the element 7 and against the clutch engaging springs 9 (one only being shown) in order to permit disengagement of the clutch, the disengaging mechanism comprising levers 10 (one only being shown), a sliding sleeve 11 and a clutch throwout shaft 12, all of well-known construction. The clutch throwout shaft is hydraulically actuated by the clutch pedal 13 and this mechanism consists of a compressor 14 connected by a conduit 15 with a fluid motor 16. The piston 17 of the compressor is adapted to be actuated by the clutch pedal through the medium of the piston rod 18 and the piston 19 of the fluid motor is connected to actuate the clutch throwout shaft by means of the piston rod 20 and the arm 21 on the exterior end of throwout shaft 12. The piston 19 of the motor is biased against its piston rod by a light spring 22, and a spring 23 is employed to normally maintain piston 17 of the compressor in a retracted position where a port 24 is uncovered for placing the system in communication with a reservoir 25 to permit expansion and contraction of the liquid.

There is also shown in Figure 1 a well-known hydraulic braking system for the vehicle which comprises a brake pedal 26 connected to a piston rod 27 for actuating the piston 28 of the compressor or master cylinder device 29 which is in communication with the fluid motors 30 of the brake assemblies 31 through the conduit 32 and branch conduits 32'. The master cylinder is provided with a reservoir 33 which communicates with the cylinder thereof by a port 34 when the piston is in its retracted position under the action of the return spring 35.

The braking mechanism has associated therewith a control valve mechanism 36 carried by the end of the master cylinder and connected with conduit 32, whereby fluid under pressure may be maintained in fluid motors 30 of the brake assemblies to hold the brakes applied under certain conditions. The control valve mechanism illustrated in Figure 2 by way of example is similar to that shown in Figure 6 of the patent to Walter R. Freeman No. 2,030,288, issued February 11, 1926. Briefly described, this mechanism comprises a casing 37 having a chamber 38 therein communicating with the master cylinder by means of passage 39 and passage 40 through the attaching bolt 41 and also communicating with conduit 32 by a port 42. Within the chamber is a cage formed by end plates 43 and 44 and interconnecting rods 45, the lower two (one only being shown in Figure 2) of which form a track for a ball 46. The end plate 43 carries an annular rubber valve seat 47 which is adapted to engage with the end wall of the chamber surrounding the open end of passage 39 under the action of spring 48 interposed between end plate 44 and a closure plug 49. The cage is moved in the chamber to unseat valve seat 47 by a cam 50 secured to a cross shaft 51 extending to the exterior of the casing. The casing is so attached to the master cylinder that the track formed by the lower rods 45 will be at a slight angle to the roadway on which the vehicle is positioned, thus insuring that the ball will be against seat 47 when the vehicle is on either a horizontal roadway or facing upward on an inclined roadway.

In accordance with our invention, we control the valve mechanism 36 by the fluid pressure in the hydraulic system for actuating the clutch and in such a manner that the valve mechanism will be permitted to assume an operating position at the moment the clutch is disengaged and will be caused to be ineffective when the clutch elements are permitted to assume a position where they contact during their re-engaging movement. A fluid motor 53 formed of a casing 54 and a diaphragm 55 has its fluid receiving chamber 56 connected by a conduit 57 with conduit 15 of the clutch actuating fluid system. The diaphragm has secured thereto a piston rod 58 which extends through a guide sleeve 59 and is connected to the arm 60 on the cage operating shaft 51 of the control valve mechanism 36. The guide sleeve 59 is threaded in the wall of casing 53 of the fluid motor and interposed between it and the diaphragm is a coil spring 61. This spring is of sufficient strength in comparison with the size of the diaphragm that when properly adjusted it will prevent the diaphragm from moving to operate arm 60 until a predetermined fluid pressure is built up in chamber 56.

Referring to the operation of the above described mechanism, spring 61 is preferably adjusted by sleeve 59 so the diaphragm of fluid motor 53 will not be moved to the left until the pressure developed in the clutch actuating system and chamber 56 is sufficient to disengage the clutch. With this adjustment it is apparent that when the clutch pedal is depressed sufficiently to cause disengagement of the clutch, fluid motor 53 will be operated at the time of disengagement of the clutch and arm 60 rotated to the position shown in Figure 2 wherein cage 7 will be at the left end of chamber 38 and seat 47 will be in contact with the surface surrounding passage 39. Under these conditions, if the vehicle is stopped on a horizontal roadway or facing upward on an inclined roadway, ball 46 will engage valve seat 47 under the action of gravity and the brakes, if applied, will be maintained in applied position, and if they are not applied, they may be applied by actuation of master cylinder 29 and then held in applied position. When it is desired to start the vehicle by engaging the clutch and accelerating the engine in the usual manner, the clutch pedal is released and, as a result thereof, the clutch will engage under the action of its springs 9. When the plates of the clutch contact, the pressure in the clutch actuating system and in fluid motor 53 will immediately drop and the diaphragm will be free to be moved to the right under the action of spring 61. This will cause arm 60 to be moved to the position shown in Figure 1 wherein cam 50 will move the cage to the right end of chamber 38 of the control valve mechanism. This will cause valve seat 47 to be moved away from the surface of the end of the chamber and fluid can then flow from the braking assemblies back to the master cylinder 29. Under conditions where the clutch is disengaged when the vehicle is moving on a roadway and the brakes are applied, the brakes will not be held in applied position due to the fact that ball 46 will not seat against valve seat 47 for the action of inertia during the deceleration of the vehicle will maintain the ball at the right end of the cage.

From the foregoing, it is readily apparent that we have devised a control means for maintaining the brakes of the vehicle in applied position when such condition is desired. The brakes will always be released at the proper movement when the clutch is permitted to re-engage after it has been disengaged. The release of the holding means is dependent upon the pressure in the clutch actuating system and with the proper setting of the adjustable spring 61, this release will always come at the time when the clutch plates contact. Thus it is seen that once the adjustment of spring 61 is properly made, no further adjustment is necessary regardless of whether the clutch plate faces wear or not. The operation of fluid motor 53 and control valve mechanism 36 is in no way dependent upon the movement of the clutch pedal but solely upon the fluid pressure in the clutch actuating system.

Being aware of the possibility of modifications in the particular structure herein described without departing from the fundamental principles of our invention, we do not intend that its scope be limited except as set forth by the appended claims.

Having described our invention, what we claim as new and desire to secure by Letters Patent of the United States is:

1. In a motor vehicle provided with braking mechanism, means associated with the braking mechanism for holding the brakes applied, a fluid pressure system comprising an operator-controlled source of pressure and a fluid motor for operating an element of the vehicle, and means governed by fluid pressure in said system for controlling said brake holding means, said last named means being independent of said motor.

2. In a motor vehicle provided with braking mechanism and means associated with the braking mechanism for holding the brakes applied, a fluid pressure system, including a fluid motor for operating an element of the vehicle, a second fluid motor for operating the brake holding means, conduit means for placing the fluid motor for the brake holding means in communication with the fluid pressure system, and means whereby said last named fluid motor will be operated when the fluid pressure exceeds a predetermined value.

3. In a motor vehicle provided with braking mechanism and means for interrupting the transmission of power to the vehicle wheels, means associated with the braking mechanism for holding the brakes applied, fluid pressure operated system for controlling the interrupting means and comprising an operator-controlled source of pressure and a fluid motor, and means governed by fluid pressure in said system for controlling said brake holding means, said last named means being independent of said motor.

4. In a motor vehicle provided with braking mechanism and with clutch mechanism, means associated with the braking mechanism for holding the brakes applied, fluid pressure-operated means including an operator-controlled source of pressure in excess of atmospheric pressure and a fluid motor for disengaging the clutch and permitting its reengagement, and means controlled by fluid pressure in the clutch operating means to cause said brake holding means to be operative.

5. In a motor vehicle provided with braking mechanism and means associated with the braking mechanism for holding the brakes applied, a fluid pressure system including a fluid motor and a compressor connected thereto, clutch mechanism operated by said fluid motor, a second fluid motor for operating the brake holding means, conduit means for placing the fluid motor for the brake holding means in communication with the fluid pressure system, means whereby said last named fluid motor will be operated when the fluid pressure exceeds a predetermined value, and means for varying the predetermined value of the fluid pressure necessary to operate said last named fluid motor.

6. In a motor vehicle provided with a clutch mechanism biased to clutch-engaged position by a predetermined pressure and with a braking mechanism having means associated therewith for holding the brakes applied, fluid pressure-operated means including an operator-controlled source of pressure in excess of atmospheric pressure and a fluid motor for disengaging the clutch against its biasing means and permitting its reengagement, and means for operating the holding means by pressure in the fluid pressure-operated means for the clutch and when said pressure is of a value to cause the clutch to be disengaged.

7. In a motor vehicle provided with a clutch mechanism biased to clutch-engaged position by a predetermined pressure and with a braking mechanism having means associated therewith for holding the brakes applied, fluid pressure-operated means disengaging the clutch against its biasing means and permitting its reengagement, said means comprising a fluid motor and a source of pressure connected thereto, a fluid motor for operating the holding means and in communication with the fluid pressure-operated means of the clutch, and means whereby said last named fluid motor will be operated when the pressure in the fluid pressure-operated means for the clutch is of a value to cause the clutch to be disengaged.

8. In a motor vehicle provided with a clutch mechanism biased to clutch-engaged position by a predetermined pressure and with a braking mechanism having a brake actuating unit and a source of fluid pressure connected thereto by conduit means, valve means associated with said conduit means for preventing return flow of fluid from the unit, fluid pressure-operated means for disengaging the clutch mechanism against its biasing means and permitting its re-engagement, said means comprising a fluid motor and a source of pressure connected thereto by conduit means, a fluid motor for operating said valve means and in communication with the conduit means of the fluid pressure-operated means for the clutch, and means whereby said valve means will be operated by its operating fluid motor when the pressure in the fluid pressure-operated means for the clutch is of a value to cause the clutch to be disengaged.

9. In a motor vehicle provided with a clutch mechanism biased to clutch-engaged position by a predetermined pressure and with a braking mechanism having a brake actuating unit and a source of fluid pressure connected thereto by conduit means, valve means associated with said conduit means for preventing return flow of fluid from the unit, fluid pressure-operated means for disengaging the clutch mechanism against its biasing means and permitting its reengagement, said means comprising a fluid motor and a source of pressure connected thereto by conduit means, a fluid motor for operating said valve means and in communication with the conduit means of the fluid pressure operated means for the clutch, yieldable means for preventing the valve operating fluid motor from being operated by fluid pressure except when the fluid pressure exceeds a predetermined value, and means for adjusting the yieldable means to thereby vary the value of the fluid pressure necessary to operate the valve operating fluid motor.

10. In a motor vehicle provided with braking mechanism and with clutch mechanism, means associated with the braking mechanism for holding the brakes applied, apparatus operated by hydraulic pressure and comprising a motor for disengaging the clutch and permitting its re-engagement, a motor for controlling the holding means, and connections whereby said last named motor will operate in response to the liquid pressure in the clutch operating apparatus.

WALTER R. FREEMAN.
BURNS DICK.
WERNER F. BOLDT.